United States Patent [19]

Collet

[11] Patent Number: 4,799,714
[45] Date of Patent: Jan. 24, 1989

[54] SLEEVE TYPE CASING HEAD ADAPTER ADAPTER

[76] Inventor: James R. Collet, 315 Lynn Dr., Lafayette, La. 70508

[21] Appl. No.: 102,012

[22] Filed: Sep. 28, 1987

Related U.S. Application Data

[63] Continuation of Ser. No. 856,224, Apr. 28, 1986, abandoned, which is a continuation-in-part of Ser. No. 578,576, Feb. 9, 1984, abandoned.

[51] Int. Cl.$^4$ .............................................. F16L 21/08
[52] U.S. Cl. .................................. 285/145; 285/308; 285/421
[58] Field of Search ................. 285/403, 404, 93, 421, 285/382.7, 144, 145, 343, 350, 141, 308

[56] References Cited

U.S. PATENT DOCUMENTS

| | | | |
|---|---|---|---|
| 2,829,909 | 4/1958 | Magnami | 285/351 |
| 2,897,895 | 8/1959 | Ortloff | 285/308 |
| 3,585,803 | 11/1968 | Bordgette | 285/308 |
| 3,606,393 | 9/1971 | Huntsinger et al. | 285/308 |
| 3,844,127 | 10/1974 | Koop et al. | 285/141 |
| 3,941,410 | 3/1976 | Miyaoka | 285/404 |
| 4,094,539 | 6/1978 | Reimert | 285/403 |
| 4,345,785 | 8/1982 | Bradford | 285/404 |
| 4,479,669 | 10/1984 | Hynes | 285/404 |

FOREIGN PATENT DOCUMENTS 2099945 12/1982 United Kingdom ............... 285/308

*Primary Examiner*—Dave W. Arola
*Attorney, Agent, or Firm*—Keaty & Keaty

[57] ABSTRACT

A casing head adapter is mounted upon the top of a casing of an oil well by being slipped over the oil well casing and mechanically locked into place. No welding is required to provide a substantially strong, fully pressure intergal casing head upon the top of the casing. The casing head adapter comprises a substantially cylindrical hollow body having a plurality of internal grooves to accommodate a number of O-rings and a plurality of curved wedges releasably mounted in one of the internal grooves. The wedges have upwardly directed teeth for frictional engagement with the casing if a sudden rise in downhole pressure forces the wedges upwardly. The casing head adapter is provided with a plurality of set screws for locking the wedges in place, as well as a number of release screws for assisting in releasing the wedges from the frictional engagement with the casing if the teeth "bite" excessively into the casing due to an occasional rise in downhole pressure. At least one pressure test port is provided in the annular space between the casing and the casing head adapter. The sleeve type casing head adapter is removable by mechanically withdrawing the wedges from their engagement with the casing, therefore allowing reuse of the casing head adapter should the hole prove to be "dry".

5 Claims, 2 Drawing Sheets

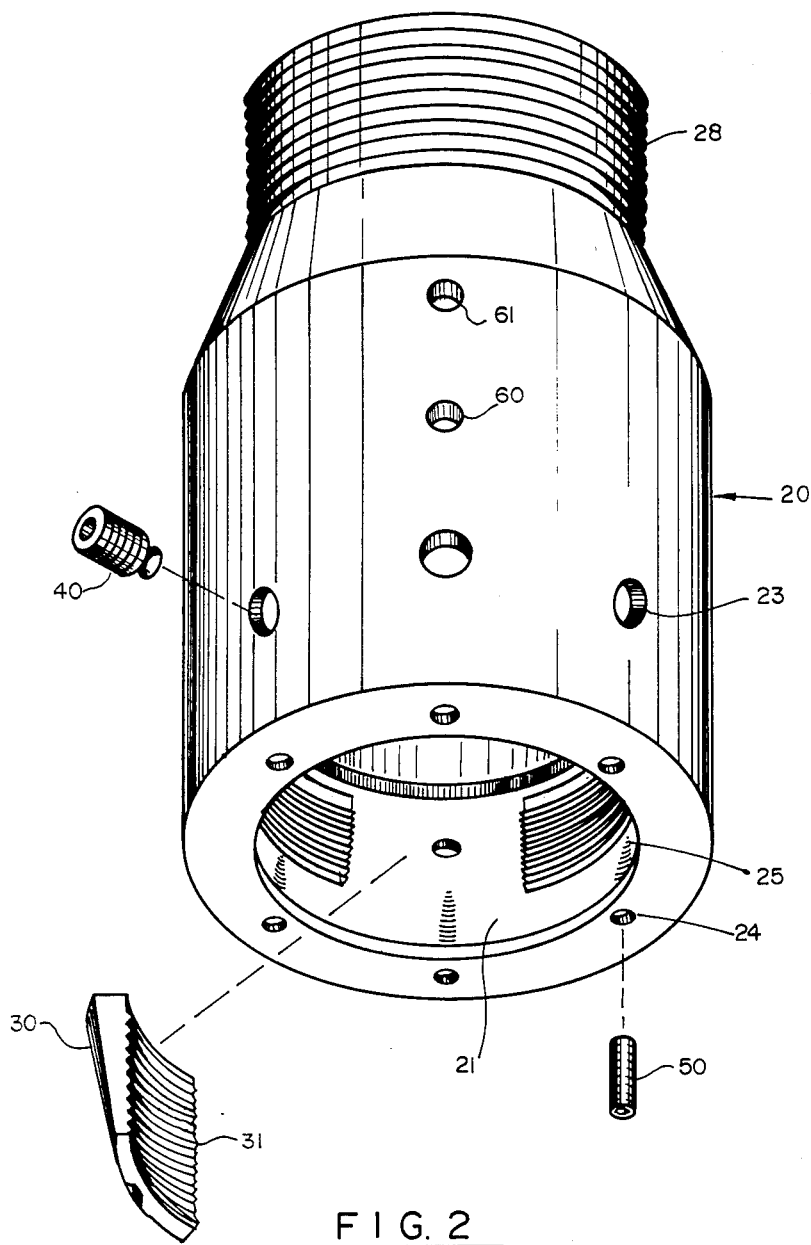
FIG. 2
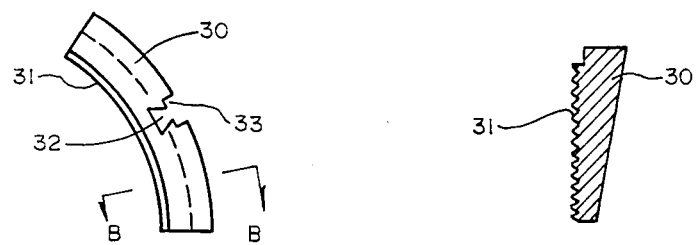
FIG. 3a
FIG. 3b

SLEEVE TYPE CASING HEAD ADAPTER

This is a continuation of application Ser. No. 856,224, filed Apr. 28, 1968, now abandoned, which is a continuation-in-part of my copending application, Ser. No. 578,576, filed Feb. 9, 1984 now abandoned.

BACKGROUND OF THE INVENTION

1. Field of the Invention

The present invention relates to a sleeve type casing head adapter to be attached to a casing, and more particularly to a reusable sleeve type casing head adapter.

2. General Background of the Invention

In the oil industry, when drilling a deep well, it is customary to begin by installing a relatively short length of casing, the top of which is connected to a casing head. The casing head is usually slipped onto the upper end of the casing, the upper end of the casing is welded along its periphery to the inner surface of the casing head, and the lower end of the casing head is welded to the exterior of the casing (before the welding can be done, it is necessary to pre-heat the casing head and the casing at the points to be welded, as is well known in the art). Ideally, these welds secure the casing to the casing head and prevent fluid migration and pressure loss between the exterior of the casing and the interior of the casing head. After the welds have cooled, a test is performed to determine if any leaks exist. If not, the installation of the equipment proceeds. If there are leaks, the casing head is rewelded.

If the well is not brought to production completion, the casing is normally cut below the casing head and is sent to a machine shop to have a "Dutchman" (i.e., a piece of pipe welded onto the casing head) machined out of the casing head in an effort to salvage the casing head. This is an expensive and time consuming task.

SUMMARY OF THE INVENTION

The present invention provides a sleeve type casing head adapter which overcomes the problems of the previous casing head adapters which were secured to the casing by means of welding. The casing head adapter of the present invention provides superior resistance to vertical movement of the casing head relative to the casing, as well as superior resistance to fluid flow between the exterior of the casing and the interior of the casing head, as compared to previous devices. Furthermore, the casing head adapter of the present invention attaches to the top of oilfield casing quickly, without the need for welding, and has means to allow it to be easily removed and reused as need or opportunity dictates.

The casing head adapter comprises a sleeve, which has an interior surface which has an upper portion having a diameter which substantially matches the interior diameter of the casing, and a lower portion whose diameter substantially matches the exterior diameter of the casing. Recessed into the lower portion of the interior surface of the sleeve type casing head adapter is the wedging means which includes a plurality of curved wedges which, in the preferred embodiment, are serrated inserts or slips which are tapered and are further described herein. Each curved insert or wedge is attached to the casing head adapter by a securing means such as a set screw which has a foot slidable in a vertical groove disposed in the outer surface of the insert. The inner surface of the insert or wedge has teeth which project upwardly. Attachment of the sleeve type casing head adapter to the casing is achieved by slipping the sleeve type casing head adapter onto the casing and tightening the set screws such that the teeth of the inserts or wedges frictionally contact the outside of the casing.

The inner surface of the lower portion of the sleeve type casing head adapter is provided with a plurality of parallel circumferential grooves. At least two of these house O-rings between which is a pressure relieving or receiving test port extending from the inner surface of the casing head adapter to the outer surface of the casing head adapter. The test port may have a pressure retention valve set therein to prevent loss of pressure or fluid when the test port is not in use.

Another feature of the present invention is that once the casing head adapter is securely attached to the casing, any forces attempting to separate the casing and the casing head adapter tend to strengthen the bond between the casing and the casing head adapter, as upward movement of the casing head adapter relative to the casing causes the teeth of the toothed or serrated inserts or wedges to bite into the casing and cause the tapered wedges to more securely clamp the casing head adapter to the casing. Means are provided to release the inserts from the frictional engagement with the casing.

It is an object of the present invention to provide a casing head adapter which may be installed mechanically, without the need for welding, and consequently without the need for pre-heating the casing and the casing head.

Another object of the present invention is to provide a casing head adapter which may be easily removed from a casing and reused.

It is a further object of the present invention to provide a casing head adapter having provisions for the detection of leaks and seepage between the outer surface of the casing and the inner surface of the casing head adapter.

Yet another object of the present invention is to provide a casing head adapter wherein forces attempting to cause vertical movement of the casing head adapter relative to the casing instead increase the resistance of the casing head adapter to move vertically relative to the casing.

BRIEF DESCRIPTION OF THE DRAWINGS

For a further understanding of the nature, advantages and objects of the present invention, reference should be had to the following detailed description taken into conjunction with the accompanying drawings in which like parts are given like reference numerals and wherein:

FIG. 2 shows a perspective view of the casing head adapter of the present invention.

FIG. 3a shows a top view of a wedge used in conjunction with the present invention.

FIG. 3b shows a sectional-view of the wedge of the FIG. 3a taken along the lines B—B in FIG. 3a.

DESCRIPTION OF THE PREFERRED EMBODIMENT

Figure 1:
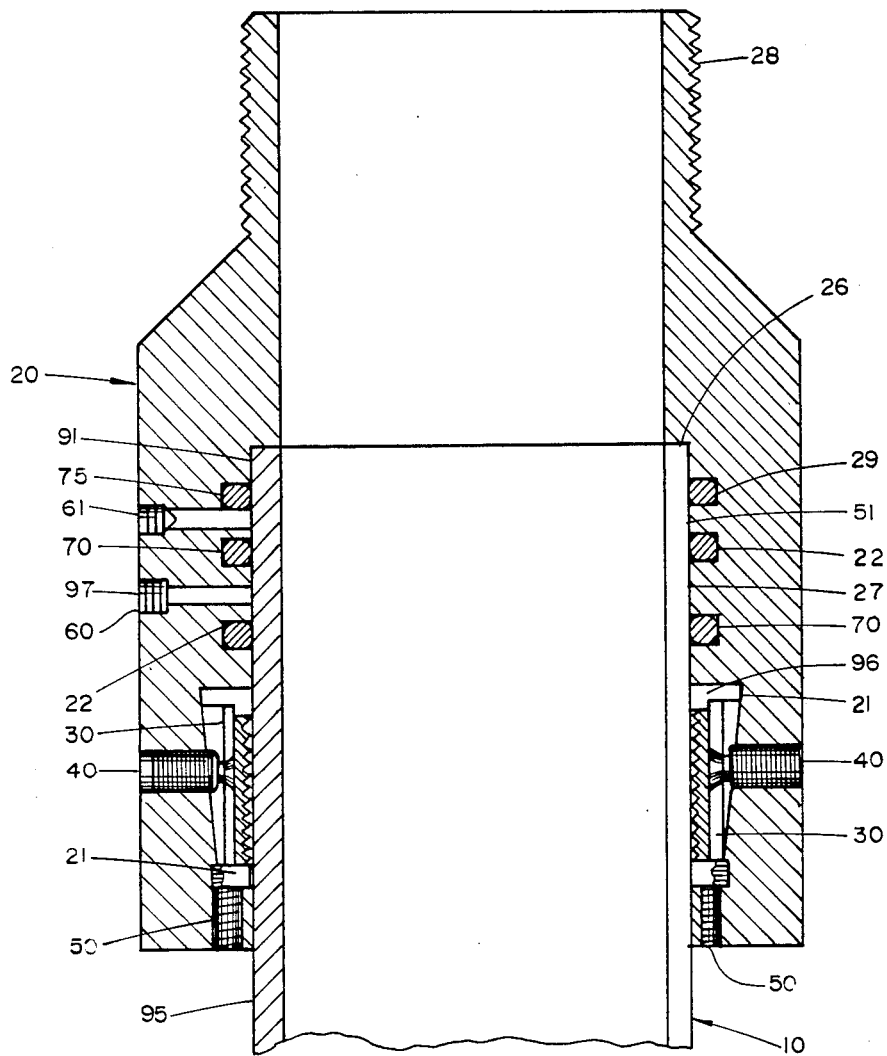
FIG. 1 shows a cross sectional view of a casing head adapter of the present invention attached to a casing.
Figure 3C:
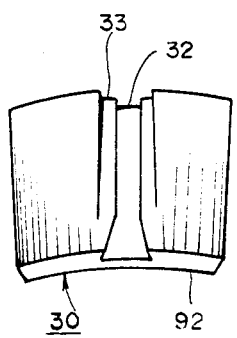
FIG. 3c shows an exterior surface view of the wedge.
Figure 3D:
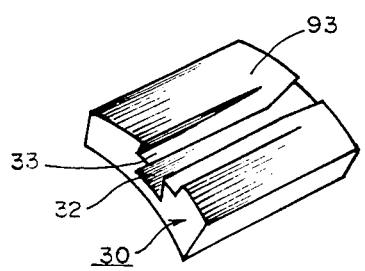
FIG. 3d shows another view of the wedge.
Figure 4:
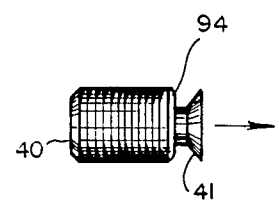
FIG. 4 shows a view of the set screw.

The sleeve type casing head adapter 20 of the present invention is illustrated in FIGS. 1 and 2. The interior surface of the casing head adapter comprises two regions, an upper region which has a diameter approximately equal to that of the inner diameter of the casing 10, and a lower region 91 which has a diameter approximately equal to the outside diameter of the casing 10. Recessed into the lower region 91 of the interior surface of the sleeve type casing head adapter 20 is a slanted annular groove 21, the walls of which have a shape approximating that of a frustrum of a conical surface. A plurality of tapered, curved wedges 30 (details of which can be seen in FIGS. 3a–3d) are present in slanting annular groove 21. The wedge 30 has upwardly projecting horizontal teeth or serrations 31. The wedge 30 also has a dove-tail slot 32 which can receive foot 41 of set screw 40 shown in FIG. 4. Wedge 30 may move in a limited vertical direction while foot 41 of set screw 40 is in dove-tail slot 32. A groove 33 with a diameter that decreases as it approaches wedge surface 92 is provided in the external surface 93 of wedge 30. The groove 33 allows foot 41 of set screw 40 to move vertically in wedge 30 until, due to vertical movement of wedge 30, shoulder 94 of set screw 40 rides up onto the shallower portion of groove 33. As wedge 30 moves downward the increasing incline of groove 33 causes shoulder 94 to press against the groove 33 causing wedge 30 to bite even deeper into the external surface 95 of casing 10. O-rings 70 are recessed in annular grooves 22 in casing head adapter 20. Additional sealing means 75 are disposed in groove 29. Although shown in FIG. 1 as an O-ring, additional sealing means 75 can be any suitable sealing means, such as lip-type packing. Threaded holes 23 allow set screws 40 to be securely inserted into the casing head adapter 20. Likewise, threaded holes 24 and threaded grooves 25 are provided to allow the wedge disengaging means, such as release screws 50, to be securely inserted into casing head adapter 20.

Release screws 50 serve as a back-up disengaging means for the wedges 30. Occasionally, although rarely, if a sudden pressure rise is encounterd during a drilling operation, the teeth of the wedges 30 "bite" ecessively into the body of the casing, and release of the set screw 40 does not completely disengage the teeth from the frictional engagement with the casing. Under such circumstances, release screws 50 (as will be described hereinafter) assist in complete disengagement of the wedge teeth 31 from the casing 10.

Threads 28 allow other equipment to be threadedly attached to casing head adapter 20. Other equipment may be attached to adapter 20 by other means available other than threads.

In operation, casing head adapter 20 is slipped onto casing 10 such that collar 26 of casing head adapter 20 seats on the top of casing 10. Sealing means which, in the preferred embodiment, are O-rings 70 disposed in annular grooves 22 serve to prevent fluid flow and loss of pressure between the exterior surface 95 of casing 10 and the interior surface 91 of casing head adapter 20. Sealing means 75 provides additional sealing protection. If necessary, the exterior of the casing may be polished for a more effective sealing surface.

Test pressure, normally on the order of 300 psi, is applied in the form of compressed air through a pressure test means such as first test port 60 into mid-ring annulus 27 and second test port 61 in mid-ring annulus 51. More test ports could be provided such as when more sealing means or O-rings were to be used. The pressure of this compressed air is monitored and provides an indication of the setting of O-rings 70 and sealing of the casing head adapter 20 against the casing 10. Also, it would be possible to apply sealing materials to mid ring annulus 27 through test port 60 which would further protect against fluid flow between the outside of the casing 10 and the interior surface of casing head adapter 20. First port 60 and second port 61 may be sealed by a test port seal means such as threaded connector 97 or other similar means.

If no leaks are detected, set screws 40 are then tightened to force the upwardly projecting teeth 31 of wedge 30 to frictionally contact the exterior of casing 10, thereby preventing casing head adapter 20 from moving vertically upward relative to casing 10. Back-up set screws (not shown) are then screwed into threaded holes 23 to prevent set screws 40 from unscrewing during subsequent drilling operations.

Should there be a tendency for casing head adapter 20 to move vertically relative to casing 10 (such as might be the case when there is an excess of pressure in the well), this tendency will cause teeth 31 of wedge 30 to bite deeper into the exterior surface 95 of casing 10 and cause wedges 30 to slide relative to casing head adapter 20 further down in slanted annular recess 21 thereby wedgingly securing casing 10 and the casing head adapter 20 even more firmly. Thus, it can be seen that, as the vertical force increases through an increase of pressure inside the casing, the unique design including wedges 30 having upwardly projecting teeth 31 disposed in slanted annular recess 21 and having teeth 31 in frictional contact with the exterior surface 95 of casing 10 causes the adapter 20 to be even more tightly secured to the casing 10. In the casing head adapter which is welded to the casing, the limited strength of the weld could result in failure of the weld since, unlike the present invention, increased pressure would not cause the adapter to resist vertical movement.

In addition to the unique features of the casing head adapter 20 of the present invention which allow it to be securely and sealingly attached to the casing in a stronger and more secure manner than is possible with casing head adapters which are welded onto casing, the casing head adapter 20 of the present invention may also be easily removed and reused. Removal of the casing head adapter 20 may be effected rather quickly. Set screws 40 are unscrewed or backed off such that they no longer exert pressure on wedges 30. If no pressure surges caused casing head adapter 20 to move upward relative to casing 10 while casing head adapter 20 was installed, casing head adapter 20 is then removed from the top of casing 10; otherwise, wedge raising release screws 50, part of the wedge disengaging means, are rotated to force wedges 30 up into the wider region of slanted annular groove 21 by forcing casing head adapter 20 downward relative to wedges 30. A chamber or space 96 is provided in annular groove 21 to allow curved wedges to move vertically into the chamber and set screws 40 may then be backed off further such that the teeth 31 of wedges 30 no longer frictionally contact the exterior of casing 10. Casing head adapter 20 may then be removed from the top of casing 10. Connecting means 28 are included on the adapter 20 to allow connection of other equipment to the adapter 20. Such connecting means can be threaded or interlocking seal mechanisms.

While the present invention has been described in conjunction with the accompanying drawings, it is understood that there are many minor modifications which would be obvious to one having ordinary skill in the art and which would not depart from the spirit or scope of the present invention. I therefore pray that my rights to the present invention be limited only by the following claims.

I claim:

1. A removable casing head adapter, comprising:
   a substantially cylindrical body having a central opening extending the length thereof defined by an internal continuous wall, said wall comprising a shoulder for positioning the casing head adapter atop a casing, and wherein secured position of the casing head adapter is insured by a force exerted by weight of the casing head adapter resting atop of the casing;
   wedging means positionable in a lower interior portion of the casing head adapter for frictional engagement with an exterior surface of the casing, said wedging means comprising a plurality of curved wedges positionable in an annular groove formed in the lower interior portion of the casing head adapter and adapted for a limited vertical slidable movement within said annular groove,
   and wherein said wedges have upwardly extending teeth adapted to frictionally engage the exterior surface of the casing and to increase their frictional engagement if an upwardly directed force attempts to disengage the casing head adapter from the casing.

2. The adapter of claim 1, furhter comprising means for securing said wedges in their frictional engagement with the casing.

3. The adapter of claim 2, wherein said wedge securing means comprise a release screw which foot portion is engageable in a vertical groove formed on an outer side of a wedge allowing the limited vertical slidable movement of the wedge within the annular groove.

4. The adapter of claim 2, further comprising means for disengaging said wedges from their increased frictional engagement with the casing.

5. The adapter of claim 4, wherein said disengaging means comprise a release screw, each acting on a bottom end of a wedge and forcing the wedge to move upwardly within said annular groove.

* * * * *